United States Patent [19]

Burgher et al.

[11] Patent Number: 4,577,085
[45] Date of Patent: Mar. 18, 1986

[54] SYSTEM OF TRANSFORMERS FOR A WELDING APPARATUS

[75] Inventors: Peter H. Burgher, Howell; John L. Boomer, Haslett, both of Mich.

[73] Assignee: Marelco Power Systems, Inc., Howell, Mich.

[21] Appl. No.: 572,396

[22] Filed: Jan. 20, 1984

[51] Int. Cl.⁴ .............................................. B23K 11/24
[52] U.S. Cl. ................................ 219/116; 219/86.25; 901/42
[58] Field of Search ...................... 219/108, 116, 86.1, 219/86.25; 901/42

[56] References Cited

U.S. PATENT DOCUMENTS 1,861,588  6/1932  Swanson et al. .................... 219/108
4,348,575  9/1982  Hedren et al. ...................... 219/86.1

FOREIGN PATENT DOCUMENTS 814766   9/1951  Fed. Rep. of Germany ...... 219/116
1078459  11/1954  France ............................... 219/116

Primary Examiner—Clifford C. Shaw
Attorney, Agent, or Firm—Gifford, VanOphem, Sheridan & Sprinkle

[57] ABSTRACT

A transformer system for resistance welding intended for installation on robotic devices comprises an auto transformer having a tap selection switch connected through electrical conductors to an isolation welding transformer located at the end of the robotic arm. The auto transformer is uniquely selected for the maximum efficiency thereof and the optimum reduction in the size of the conductors between the transformers. The isolation welding transformer is also optimally sized due to the reduction permissable by the previous interposition of the auto transformer in the welding system. Moreover, the isolation welding transformer comprises primary and secondary coils formed from tubular members each of which is cooled by a fluid coolant. Utilization of refrigerated coolant permits further reduction in size and mass, and increases electrical efficiency because of the unique design of the isolation welding transformer in which both primary and secondary windings are cooled by such fluid coolant.

11 Claims, 5 Drawing Figures

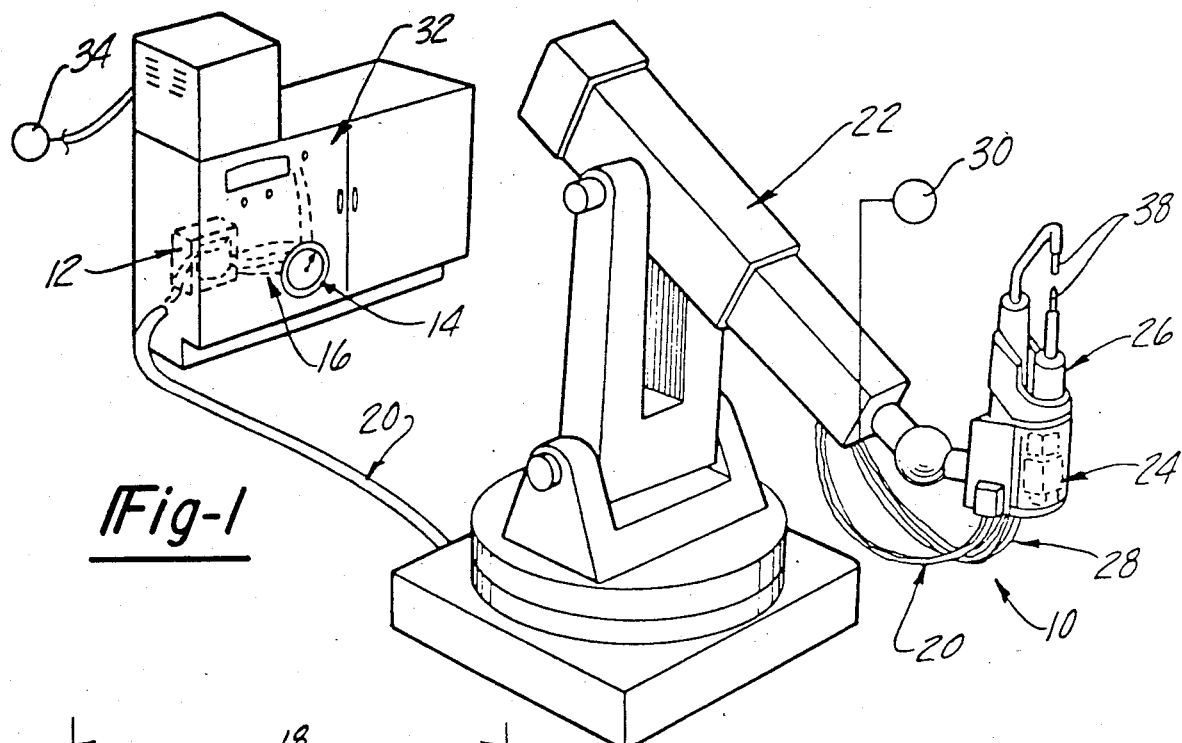
Fig-1
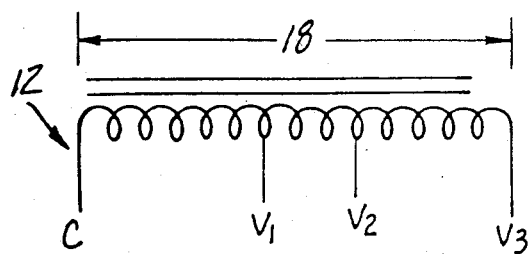
Fig-2
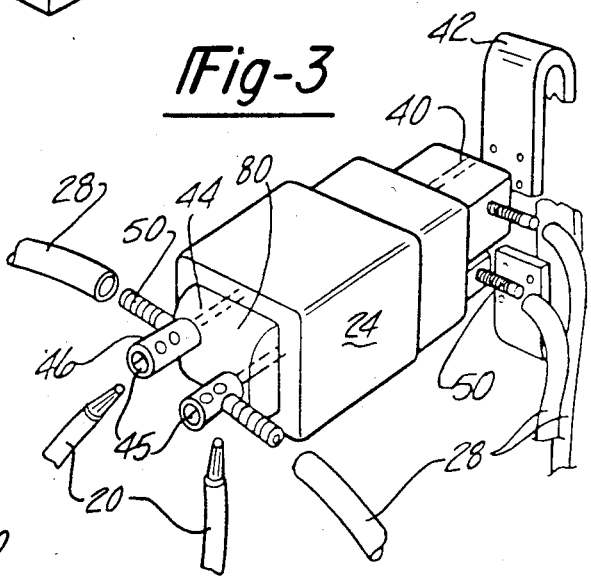
Fig-3
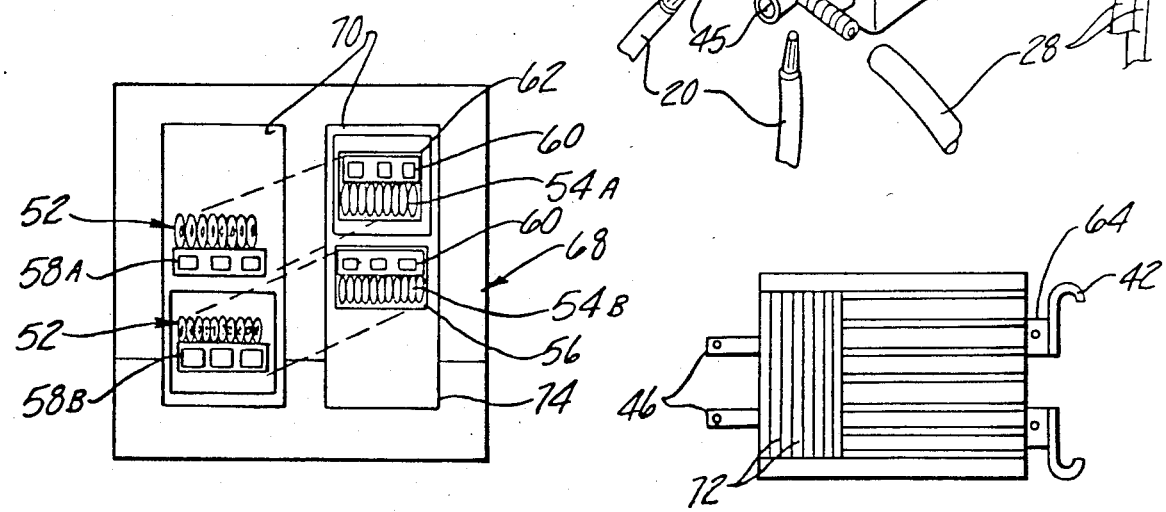
Fig-4
Fig-5

SYSTEM OF TRANSFORMERS FOR A WELDING APPARATUS

BACKGROUND OF THE INVENTION

1. Field of the Present Invention

The present invention relates generally to electric welders, and more particularly to the transformers used to convert a single phase high voltage power source to a high current power source for efficient resistance welding pulses in a robot arm welder.

2. Description of the Prior Art

Present art welding transformers generally step down line voltages of about 440–460 volts to a level of 5–7 volts by means of the turn ratios between the primary and secondary windings of a transformer in the ranges of 60:1 to 70:1. For many years, present art resistance welding transformers have been water-cooled by means of supplemental windings of cooling conduits wrapped around or through the device so that a cooling fluid can be circulated about the device to absorb heat and release it at a point remote from the transformer.

In U.S. patent application Ser. No. 416,376 for a transformer construction, the use of a cooling duct within the secondary winding of the transformer was first demonstrated as a practical invention. Usually, however, the cooling passages or conduits are separate from the windings of the transformer so they do not interfere with its operation. Thus, the heat is absorbed only after it has been conducted through a portion of the transformer and as a result, elevates the temperature of the primary and secondary windings and of the transformer core. Because of the possibility of areas of extremely high heat, so-called hot spots, transformer designers have heretofore down-rated the temperature capabilities of transformers so that the average of the so-called hot spots do not exceed the limitations of presently available insulation systems. In any event, the windings may still be subjected to large amounts of heat and high temperatures which can cause fatigue and possibly destruction of the insulation or the windings. A separate cooling system is more costly to produce, weighs more and does not convey heat away from the transformer as effectively as a cooling system which is integral with the windings themselves.

Limitations on the use of cooling passages integral with transformer windings primarily arise because of the need to electrically isolate the primary from the secondary windings of the transformer so that the effectiveness of the transformer is not reduced by conductivity of the coolant.

In U.S. patent application Ser. No. 416,376, systems of integrally cooling either the primary or the secondary windings were first demonstrated. There are, however, no welding transformers yet available in which both the primary and secondary windings are cooled simultaneously by the same coolant system.

SUMMARY OF THE PRESENT INVENTION

The present invention overcomes the above-mentioned disadvantages by providing a several transformer system in which first the voltage is stepped-down from line voltage levels to a level at which it can economically be conveyed by means of light-weight electrical conductors to another transformer which is cooled by a fluid coolant circulated through both the primary and secondary windings at the same time. The transformer having such coolant is mounted at the end of a robotic arm and because of the extra cooling capacity provided by means of cooling both the primary and secondary windings simultaneously, the transformer is further significantly reduced in size and weight. Each of the primary and secondary windings is formed in a series of loops which are spaced apart so that the loops of the primary winding can be interspersed between the loops of the secondary windings. A fluid connector is secured to each end of each winding so that the tubular winding member can communicate with the coolant circulation system. Furthermore, the present invention comprises a system of two entirely different types of transformers each selected for its optimum performance characteristics within the system.

In the preferred embodiment, the first transformer consists of what is generally known as an "auto transformer". An auto transformer has its primary and secondary windings connected to each other electrically. A portion of the energy in the auto transformer comes from this connection while the balance comes directly from the line or supply. Because of this feature, generally known in transformer design, auto transformers represent a considerable savings in cost and size over that of regular, separate winding transformers. This savings varies as the ratio of the windings changes. After the ratio of windings in an auto transformer reaches approximately 4:1 or 5:1 there is very little economy in using an auto transformer. Another generally known design factor regarding auto transformers is that an auto transformer has extremely low impedance drop, although it still has the resistance drop attributable to the metallic windings of the transformer itself. As a result of having such low impedance drop, auto transformers have little current limiting impedance and, hence, have the highest possible short circuit current of transformers generally known.

The purpose of the auto transformer in the present invention is to reduce the voltage from the line voltage level of approximately 440 to 460 volts to a level approximately ¼ to 1/5 of that, while still maintaining the highest possible available current for ultimate use in the welding transformer at the end of the robotic arm.

The system further contains a switch that enables various voltage outputs to be selected from the auto transformer so that the voltage output of the welding transformer at the end of the robotic arm can be varied according to the work schedule and the type of material to be welded. Present state of art resistance welding transformers intended for use at the end of a robotic arm have strived primarily for extremely light weight and, as a consequence, do not have the facility of varying voltages through use of taps or tap switches as is claimed for the present invention.

The concept of taps on a transformer is well known. Switches are commonly employed in welding transformers used for resistance welding applications. However, the use of a welding type tap switch has heretofore not been employed with an auto transformer. The tap switch is connected by means of wires to various locations in the primary winding of the auto transformer, enabling an operator to select different output voltages according to the above-mentioned work and metal requirements. The use of an auto transformer enables a reduced size transformer to be located at the end of the robotic arm and thus improves the facility of the robotic device as a welding device.

The system further consists of two current carrying wires or members which are suitably insulated for the levels of voltage and current to be encountered in the system. Such wires are typically between 12 and 14 feet in length and connect the auto transformer to the transformer utilized for the actual welding process located at the end of the robotic arm. These wires can be ¼ to 1/5 in overall size of wires otherwise required to convey welding current to the welding gun. Determination of the size of wire can be made by using the standard formula that the square root of the size of wire reduction equals the approximate overall size of the conductor. Assuming that an overall reduction in voltage from the line voltage of 440 volts in the order of 80:1 is required, under the present invention, utilizing a 4:1 auto transformer at the base of the robotic device requires the welding transformer at the end of the robotic arm to only have a 20:1 reduction factor. This means the conductors between the auto transformer and the welding transformer at the end of the arm can have 1/20 of the conductivity or (square root of 20) approximately 1/5 the size of wires otherwise required. In robotics welding applications, the size of the wire connecting the transformer mounted at the base of the robot to the welding device at the end of the arm represents a considerable load and inhibits the ability of the robotic device to do work. By reducing the wire's capacity to 1/5 of present practice, the robotic device is thereby freed to be more agile, move more rapidly and perform work at extreme angles and with agility not heretofore obtained.

The present invention further comprises an isolation transformer located at the end of a robotic arm. Heretofore, it has not been possible to construct a universal, robotics isolation transformer with low enough impedance suitable for welding use because of weight requirements necessary for dissipation of the extreme heat generated by the use of the transformer in the welding process. The present invention comprises an isolation transformer uniquely constructed with primary and secondary windings consisting of tubing, preferably copper tube, which is formed through the use of heat and bending mandrils. The tubing is then insulated with undiluted epoxy varnish which is then baked upon the windings before they are assembled into the transformer. Because the present invention consists of having both the primary and secondary windings of the welding transformer cooled with a fluid coolant, the possibility of a short circuit or reduction in efficiency would occur if the transformer were to be designed in accordance with the present art. By use of an isolation transformer, the effect of electrical conductivity, even if the coolant is water, is greatly reduced. Thus, the pulsations of voltage which cause the transformer to operate are conveyed between windings primarily through the transformer core and not between windings directly themselves. The use of an isolation transformer thus permits a directly cooled primary and a directly cooled secondary and eliminates the limits on transformer capacity heretofore obtained by air or other normal cooling systems.

A further extrapolation of the present invention utilizes a refrigerated coolant to further reduce the temperature of the welding transformer located at the end of the robotic arm. Since the limiting factor of transformer capacity (or "KVA rating") is heat, the use of a refrigerated coolant further raises the KVA rating of the welding transformer. Because both the primary and secondary windings are cooled in the present invention, there is no longer a requirement that heat generated by one winding be conveyed through to the other winding, whichever might singly be cooled under present art.

The preferred embodiment of the present invention also discloses a welding transformer having 9 volts maximum secondary voltage and 3.5 minimum secondary voltage based upon a selection of taps in steps ratably dividing the difference between those two values as heretofore described as a part of the auto transformer which supplies the basic power for the system.

Advantages of a system thus designed include:

1. A system for resistance welding using devices suitably designed for use of robotic equipment.

2. The ability to vary voltage at the robotic welding transformer based upon a selective switch located at the base of the unit.

3. A system which permits the minimum wire size necessary for conveying welding current to the welding transformer consistent with the optimum efficiency of both transformers within the system.

4. The use of an auto transformer to do part of the voltage reduction enables a reduced size welding transformer at the end of the robotic arm.

5. The use of directly cooled primary and secondary windings in the welding transformer at the end of the robotic arm eliminates power limits and permits significantly greater welding power than currently available in a welding transformer.

6. The use of refrigerated coolant to further permit increases in welding power or reductions in transformer size and cost.

Several advantages of the present invention depend upon a number of important factors including:

1. A means of insulating formable hollow copper members so they do not electrically contact one another when assembled into a transformer device.

2. The use of an auto transformer to do part of the voltage reduction.

3. The use of an isolation transformer for welding as compared with the present art, thus permitting both the primary and secondary windings to be cooled by a fluid coolant system.

4. The balancing between the optimum efficiency of the auto transformer selected for its low impedance and high short circuit current capabilities and the isolation transformer selected for its optimum size to weight relationship in order to obtain the design voltages necessary for appropriate welding power within such a system.

BRIEF DESCRIPTION OF THE DRAWINGS

The present invention is clearly understood by reference to the following descriptions of the preferred embodiment when read in conjunction with the accompanying drawings in which:

FIG. 1 is an overall view of the welding transformer system applied to a robotic arm welder and its various components;

FIG. 2 is a diagrammatic view of the auto transformer, tap switch and associated wiring;

FIG. 3 is a sectional view of the robotic welding transformer in conjunction with a typical robotic welding gun, both located at the end of a robot arm;

FIG. 4 is a diagrammatic cross sectional view of the isolation transformer; and

FIG. 5 is a side view of the isolation transformer.

DETAILED DESCRIPTION OF THE PREFERRED EMBODIMENT OF THE PRESENT INVENTION

Referring first to FIG. 1, a welder 10 constructed in accordance with the present invention is thereshown generally comprising a power control 32 and a robotic arm mechanism 22. The power control 32 is adapted to include auto transformer 12, and a tap switch 14 which is shown having wires 16 extending to various locations on the primary winding 18 (FIG. 2) of the auto transformer. Conveying the thus adjusted current from the auto transformer 12 are two conductors 20 which follow along the arm 22 of the robotic welder device 10 to an isolation transformer 24 located in conjunction with the welding gun 26 at the end of the robotic arm 22. Also shown are four coolant tubes 28 which consist of flexible members connecting the welding, isolation transformer 24 to a coolant reservoir or refrigerant source 30 as shown diagrammatically.

The welding control 32 is connected to a source 34 of line voltage.

Referring to FIG. 2, the auto transformer 12 is further described as having a single winding 18 which is tapped to produce various secondary voltages such as between taps V1 and V3, or V2 and V3. Wires or connectors 16 are connected at the tapping points V1–V3 along the winding so as to adjust the relationship between input voltage and output voltage in various ratios as selected by a multi-position rotary switch called a tap switch 14. In FIG. 2, the auto transformer 12 is shown in a diagrammatic electrical drawing because the style and techniques of auto transformer construction per se are well known and, as such, are employed herein as may be required by the voltage and current demands of the system.

Referring now to FIG. 3, an isolation transformer 24 is located at the end of a robotic arm in conjunction with a commercially available resistance welding gun 26 having electrodes 38. The isolation transformer 24 is constructed in such a fashion that it's secondary winding connections 40 are located to match and connect with terminals or flexible shunts 42 which are generally of the type employed in welding guns. Moreover, the connections 40 comprise a manifold 64 (FIG. 5) for introducing fluid coolant to the secondary winding. The primary connections 44 of the isolation welding transformer 24 are located at the opposite end from the secondary connections 40 and connect by means of suitable lugs 46 to the current carrying wires 20. Additionally, the lugs 46 form a manifold that conveys a fluid coolant to the welding transformer's primary windings by means of the tubes 28.

A further refinement is shown in the sectional view FIG. 4 which discloses the construction of the isolation welding transformer 24 itself. In the transformer, the primary windings 52 comprise a plurality of loop sections 54a, 54b etc., each of which is encased in an epoxy varnish coating 56 applied over the primary windings and baked before the transformer is assembled. Each loop section 54 comprises a plurality of turns of a hollow, ribbon-type conductor. Interspersed with the loops 54 of the primary windings 52 are a plurality of loop sections 58a, 58b etc., consisting of secondary windings 60 formed by several turns of hollow conductor. The secondary winding is also insulated by means of an epoxy varnish coating 62 applied and baked before the transformer is assembled. Of course, each loop section is electrically and fluidly connected to the adjacent loop sections of the same winding. Moreover, an insulation layer extends between each loop 54 and the adjacent loop 58. Of course, an insulating varnish is applied over the periphery of the conductors forming the coils in each loop section.

The primary windings 52 are attached to lugs 46 which comprises an electrical connection means 45 in the form of an aperture intersected by a set screw for securing the wires 20 transmitting current from the auto transformer in the same system, and a fluid passage in which fluid can be conducted to the hollow tubular conductor of the primary windings themselves from source 30. Similarly, the secondary windings 60 terminate in manifolds 64 that permit electrical connections of the secondary windings to the welding gun 26 and also permits induction of a fluid coolant through the manifold from source 30 so as to similarly cool the secondary windings themselves.

Fluid passageways in the primary and secondary windings connections, fluidly communicate through nipples 50 threaded into openings in the lugs 46 and in manifolds 64. The nipples 50 can be inserted into each of the four primary and secondary tubes 28.

Additionally, as disclosed in FIGS. 4 and 5, the transformer 24 includes a core 68 consisting of commercially available, grain oriented, transformer silicon steel. The core is formed of sections shaped similarly to "E"s and "I"s. Each such lamination layer 72 consisting of an "E" shaped and and "I" shaped section is stacked against others to define elongated slots 70 into which the loops of the primary and secondary windings of the transformer are fitted. The transformer core layers 72 are reciprocally positioned in reverse order to each adjacent layer so the abutting ends of each "E" and "I" section do not coincide and are consistently overlapped by solid portions of adjacent laminations to minimize flux losses in the core. Laminated construction of the core likewise serves to reduce flux losses through the core.

Additionally, dialectric tape and varnish insulation layer 74 is interposed between each loop of the secondary winding and each loop of the primary winding and between all windings and the core, respectively. The entire construction is assembled with the above described insulation appropriately positioned, the laminations interposed within the slot sections located to coincide with the windings of the primary and secondary systems and the entire device is clamped together and impregnated with varnish in a vacuum and then baked to attain desired final insulation standards.

In the preferred embodiment, the exposed ends of the thus impregnated, varnished assembled and baked transformer are covered or "potted" with an insulating material such as a dialectric epoxy as shown at 80 in FIG. 3. This material further enhances the conductivity of heat away from the transformer and into the coolant as it traverses the fluid passageways within the transformer.

Thus described, it can be seen that the isolation welding transformer 24 can be mounted at the end of a robotic arm 22 in conjunction with an appropriate welding gun 26 applicable to the type of work to be performed without the necessity of installation of complex external cooling apparatus or addition of excessive weight. Through use of an auto transformer 12 to reduce the voltage being conveyed to the welding transformer, the conductive wires 20 transmitting the electrical power between the two transformers are reduced in size as compared with present art. Further, since the loops of both the primary and the secondary coil are cooled with a fluid coolant, and need not transmit heat, generated through the operation of the transformer, to each other or the core for cooling, each of the primary and secondary coils can be suitably reduced in size. Moreover, such reduction is in addition to a corresponding reduction in core weight contrary to previously known welding transformers wherein weight was increased as the core was enlarged to increase heat transfer from the windings.

Thus, the combination of transformers substantially reduces the size of the welding transformer overall as compared with present art. Since the heat of the welding transformer is absorbed within the primary and secondary windings themselves, the heat is more effectively dissipated from the transformer than with previously known water-cooled transformers which employ external conduits or fluid passageways in the core to dissipate heat away from the transformer. Since the fluid passageways are incorporated in both the primary and secondary members, the device is substantially lighter and less complex than previously known water-cooled transformers.

Any reduction in efficiency due to electrical conductivity of the fluid coolant is reduced to a level which has no impact upon the operation of the transformer by locating the coolant reservoir remotely at an optimum distance therefrom. Furthermore, such conductivity as may exist through the coolant reduces the impedance of the transformer, a desirable end result.

The use of tubular members formed in the shape of the needed windings and then insulated at the point of manufacture is not limited in the present invention by the constraints of commercially available magnet wire insulation systems because of the cooling methods in this invention which allow the transformer to operate at levels of heat which are much lower than heretofore obtained. Thus, exotic and expensive magnet wire insulation systems are no longer required in this design. Physical coupling between the primary and secondary windings in the welding transformer is eliminated in the present invention. Adequate magnetic coupling is provided by means of the transformer core as heretofore described. In the present invention, the core solely provides a means of magnetically coupling the primary and secondary windings and is not utilized or needed for cooling or removing the heat generated by transformer action.

Having thus described my invention, modifications thereto may become apparent to those skilled in the art to which it pertains and many such modifications may be obtained without departing from the scope and spirit of the present invention as described in the appended claims.

What is claimed is:

1. A welding system comprising:
   a pair of welding electrodes,
   an isolation transformer having a primary coil and a secondary coil,
   means for mounting said isolation transformer closely adjacent said electrodes,
   an auto transformer having a coil and a pair of taps,
   means for electrically connecting said auto transformer coil taps to said isolation transformer primary coil,
   a power source electrically connected to said auto transformer coil,
   means for mounting said auto transformer remote from said isolation transformer,
   first means for fluidly cooling said isolation transformer primary coil,
   second means for fluidly cooling said isolation transformer secondary coil,
   wherein said primary and secondary coils each comprise a tubular conductor and wherein said first and second cooling means comprises means for passing a fluid coolant through said isolation transformer primary and secondary coils, respectively.

2. The invention as defined in claim 1 comprising switching means for selectively tapping the coil of said auto transformer to vary the output voltage of said auto transformer.

3. The invention as defined in claim 1 wherein said first means comprises electrical conductors having a power capacity substantially less than the power rating required to conduct electricity directly from the power source to a single transformer.

4. The invention as defined in claim 3 wherein said conductors comprise wires having a diameter $\frac{1}{4}$ to 1/5 of the wire size required to conduct electricity directly from the power source to the single welding transformer.

5. The invention as defined in claim 1 wherein each of said primary and secondary windings comprises a plurality of loops, each loop of one winding being interposed between loops of the other winding in a stacked, consecutively alternating arrangement.

6. The invention as defined in claim 5 wherein each loop comprises at least one turn of said tubular conductor.

7. The invention as defined in claim 6 wherein the number of turns in each loop of said primary and the number of turns in each loop of said secondary winding correspond to the desired turns ratio of said isolation transformer.

8. The invention as defined in claim 5 wherein said each loop is coated with an insulating material.

9. The invention as defined in claim 8 wherein an insulating layer is disposed intermediate each coated loop of said primary winding and each coated loop of said secondary winding.

10. The invention as defined in claim 1 wherein said welding system comprises a robotic arm having a free end, said electrodes being attached to said free end of said robotic arm and wherein said isolation transformer mounting means comprises means for mountng said isolation transformer on said free end of robotic arm adjacent said electrodes.

11. The invention as defined in claim 10 wherein said auto transformer is positioned remotely from said robotic arm.

* * * * *